Dec. 24, 1935.  D. D. ARNER  2,025,263
SPRING SUSPENSION FOR VEHICLES
Filed Nov. 23, 1934
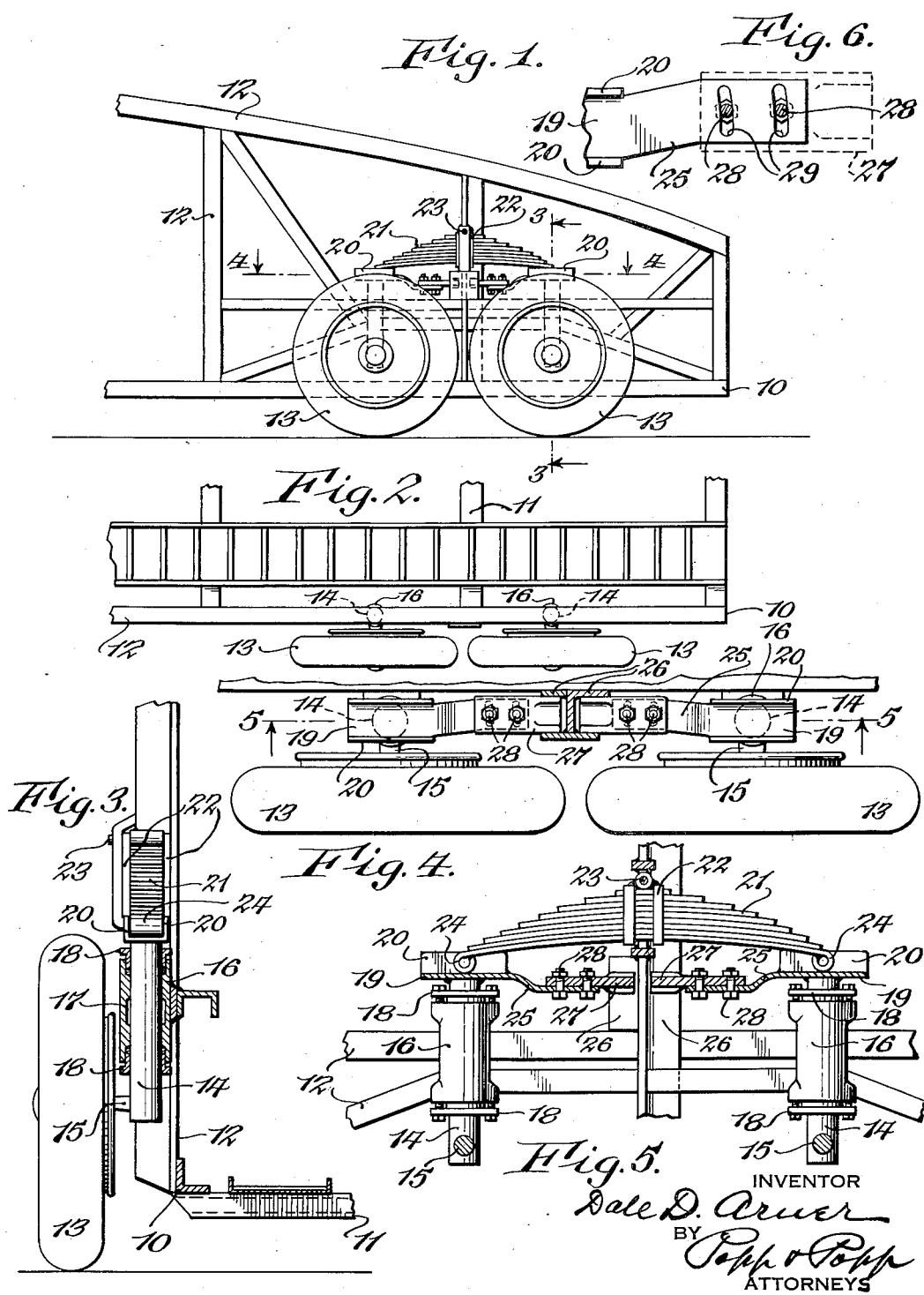
INVENTOR
Dale D. Arner
BY Popp & Popp
ATTORNEYS Patented Dec. 24, 1935

2,025,263

UNITED STATES PATENT OFFICE 2,025,263

SPRING SUSPENSION FOR VEHICLES

Dale D. Arner, Buffalo, N. Y.

Application November 28, 1934, Serial No. 755,226

4 Claims. (Cl. 280—106.5)

This invention relates to a spring suspension for vehicles and more particularly to a spring suspension of this character which is intended for use on the bodies of trailers, whereby automobiles are convoyed or transported in quantities from a point of shipment to different customers or dealers.

In such trailers it is desirable to have the bottom of the body as low down as possible in order to permit the automobiles to be more readily loaded on to the trailer and also removed therefrom. For this purpose the rear wheels of the trailer are mounted by means of spring suspensions on opposite sides of the body of the trailer in such manner that the use of a transverse axle between the supporting wheels is rendered unnecessary and thus enables the bottom of the trailer to be brought down to a point below the axis of the wheels and sufficiently near the ground that the automobiles may be readily loaded onto the trailer and unloaded therefrom.

It is the object of this invention to provide an improved spring suspension for the supporting wheels whereby the same are mounted on opposite sides of the trailer body without the use of an intervening connecting axle, which suspension means are so organized that they are capable of yieldingly carrying the maximum load which is likely to be imposed upon the same with ease and facility, and without liability of getting the suspension mechanism out of order, and which permits of using a pair of wheels in tandem arrangement on each side of the trailer body and insures the longitudinal alignment of the two wheels of each pair so as to cause the same to track properly one after the other over the road and thus avoid side strains and undue wear which otherwise would occur.

In the accompanying drawing:—

Figure 1 is a fragmentary side elevation of the rear part of an automobile transporting or convoying trailer equipped with my improved spring suspension.

Figure 2 is a top plan view thereof.

Figure 3 is a fragmentary, vertical, transverse section, on an enlarged scale, taken on line 3—3 Fig. 1.

Figure 4 is a fragmentary horizontal section, on an enlarged scale, taken on line 4—4 Fig. 1.

Figure 5 is a fragmentary, vertical, longitudinal section taken on the correspondingly numbered line in Fig. 4.

Figure 6 is a plan view of one of the retaining or controlling arms of the adjusting means whereby each of the supporting wheels is held in a proper longitudinal position.

In the following description similar characters of reference indicate like parts in the several figures of the drawing:—

Referring to the drawing, the numeral 10 represents the body of the trailer which may be of any suitable construction to support the load which is to be transported, but the body for this purpose which is shown in the drawing is more particularly intended for transporting automobiles, and as there shown the same comprises a bottom 11 which is arranged close to the ground, and side walls projecting upwardly from opposite longitudinal edges of the body, one of these side walls being shown at 12. The bottom and side walls of the trailer may be of any suitable construction, but it is preferable to employ for this purpose angle irons or bars which are suitably fabricated so as to produce a construction which is strong, light and durable.

On the rear part of the outer side of each of the side walls is arranged a pair of supporting wheels 13, 13 which are arranged one in front of the other and in longitudinal alignment, so that the wheels of each pair will follow properly lengthwise over the ground and preferably along the same track.

Each of these pairs of supporting wheels is yieldingly mounted on the outer side of the rear part of each of the side walls of the trailer body by a spring suspension mechanism which embodies my invention and which in its preferred form is constructed as follows:—

The numeral 14 represents an upright slide arranged adjacent to the inner side of each of the supporting wheels and provided at its lower end with a laterally projecting horizontal pivot or axle arm 15 upon which the respective supporting wheel 13 is journaled. This slide is preferably of cylindrical form and mounted in an upright tubular main guideway 16 so as to be capable of not only sliding vertically in this guideway but also turning horizontally therein. This guideway is rigidly mounted at its inner side on the adjacent outer surface of the respective side wall of the trailer body so that the latter and this guideway move vertically together.

For the purpose of causing this main slide to work freely in the guideway 16 a pocket 17 is provided within the central part of this guideway and around the adjacent part of the main slide therein so as to effectively lubricate the cooperating surfaces between this main slide and the main guideway, and permit the body of the trailer and the supporting wheel to move freely relative to each other.

Leakage of the lubricant from between the main slide and its guideway is effectively prevented by packing means or stuffing boxes comprising packing glands 18 secured in the upper and lower ends of the tubular main guideway and fitted closely around the adjacent parts of the main slide 14, as shown in Figs. 3 and 5. By this means the joint between each main slide and its main guideway is maintained in an easy working condition and the lubricant is prevented from escaping and becoming wasted, so that replenishment of the lubricant is only necessary at infrequent intervals.

At its upper end each of the main slides 14 is provided with a horizontal bearing member which preferably has the form of a plate 19 which is provided at its opposite longitudinal edges with inner and outer flanges 20.

Above the space between the two main guideways of the respective pair of supporting wheels is arranged a spring member which forms part of the means whereby the supporting wheels are resiliently connected with the body of the trailer so that the load carried by the trailer body is relieved from shock and carried without injury or undue vibration.

This resilient member preferably has the form of a longitudinal semi-elliptic spring 21 which is built up of a plurality of spring leaves, the central parts of which are connected with each other and mounted on the adjacent part of the respective side wall of the trailer body. This mounting may be effected in any suitable manner but preferably includes a clip 22 which embraces the central parts of the spring leaves 21 and is connected at its upper end by means of a horizontal transverse pivot 23 with the adjacent part of the body side wall, so that the spring can either rock bodily on this pin or opposite ends of the spring can move vertically independently of each other.

At its opposite ends this spring is adapted to exert a downward pressure upon the main slides 14 of the supporting wheels and this is preferably accomplished by providing each end of the lowermost leaf of the spring with a bearing eye 24 which engages with the upper surface of one of the bearing plates 19 between the longitudinal flanges 20 thereof.

Due to this construction both of the supporting wheels can rise and fall simultaneously and the same are also free to rise and fall independently of each other upon passing over uneven roads, and during such movement each end of the leaf spring 21 may be pressed upwardly by the respective main slide 14 when the supporting wheel thereof is moved upwardly relatively to the body, and thereafter the resilience of this end of the spring again presses this main slide downwardly in its guideway, thereby cushioning the shock which otherwise would be transmitted from the wheels to the body and the load carried thereon.

Means are provided for holding each of the supporting wheels in correct longitudinal alignment so that it will track properly without interfering with its vertical movement relative to the body and also for permitting this wheel to be adjusted transversely when required in order to maintain such longitudinal alignment.

Although the transverse adjusting means for this purpose may be variously constructed, it is preferable to construct the same as follows:—

The numeral 25 represents a retaining or controlling arm projecting laterally from the upper end of each of the main slides 14 and preferably forming an extension of one end of the bearing plate 19 on the respective slide. In the preferred construction the retaining arms 25 of both main slides project horizontally and lengthwise of the trailer body toward each other and have their opposing ends guided by auxiliary means on the adjacent part of the trailer body wall. In the preferred construction these auxiliary guide means include two upright auxiliary guideways 26 having preferably the form of upright channels arranged below the central part of the spring 21, and each having its open side facing the respective main slide 14; and a bearing member or finger 27 forming an auxiliary slide which moves vertically in the adjacent auxiliary guideway 26 and is adjustably connected with the adjacent retaining arm 25, so that the latter can be adjusted horizontally and transversely relative to the auxiliary slide 26 for bringing the respective supporting wheel 13 in correct longitudinal alignment relative to the trailer body.

The preferred means for effecting the adjustment of this retaining arm 25 relative to its auxiliary guide 27 consist of two bolts 28, 28 arranged one behind the other and passing with their upper parts through one of the guide fingers 27, while their lower parts pass through slots 29 in the companion retaining arm 25, as shown in Figs. 1, 4, 5 and 6. Upon loosening the bolts 28, each retaining arm 25 can be transversely moved and thereby turn each main slide in its tubular guideway the required extent for bringing the respective supporting wheel in correct alignment, after which the wheel will be held in this position by the tightening of the nuts on the bolts 28.

As a whole these means for resiliently and adjustably mounting the supporting wheels of the trailer on the body are very simple and durable in construction so that they are not liable to get out of order but they can also be readily adjusted for causing the supporting wheels of each pair to trail properly when the mechanism is first assembled, and also permits of the requisite realignment in case this becomes necessary due to wear.

I claim as my invention:—

1. In a spring suspension for vehicles, a body, a pair of vertical tubular guideways mounted one in front of the other on each side of said body, upright cylindrical slides each moving vertically in one of said guideways, spring means mounted on the body and pressing downwardly on each of said slides, an axle arm projecting laterally from each of said slides and forming a pivotal support for a vehicle wheel, and adjusting means for horizontally turning each of said vertical slides and aligning the wheels of the respective slides including a vertical auxiliary guide mounted on the body, a retaining arm arranged on said cylindrical slide, and a bearing member adjustable transversely on said retaining arm and engaging said auxiliary guide.

2. In a spring suspension for vehicles, a body, a pair of vertical tubular guideways mounted one in front of the other on each side of said body, upright cylindrical slides each moving vertically in one of said guideways, spring means mounted on the body and pressing downwardly on each of said slides, an axle arm projecting laterally from each of said slides and forming a pivotal support for a vehicle wheel, adjusting means for horizontally turning each of said vertical slides and aligning the wheels of the respective slides, and packing means arranged on the upper and lower ends of each tubular guide and around the cylindrical slide therein.

3. In a spring suspension for vehicles, a body, a pair of vertical tubular guideways mounted one in front of the other on each side of said body, upright cylindrical slides each moving vertically in one of said guideways, spring means mounted on the body and pressing downwardly on each of said slides, an axle arm projecting laterally from each of said slides and forming a pivotal support for a vehicle wheel, and adjusting means for horizontally turning each of said vertical slides and aligning the wheels of the respective slides, including a vertical auxiliary guide arranged on the body, a retaining arm projecting laterally from each cylindrical guide and provided with a pair of transverse slots, a bearing member engaging said auxiliary guide, and clamping bolts mounted on said bearing member and passing through said slots.

4. In a spring suspension for vehiicles, a body, a pair of upright tubular main guides mounted one in front of the other on each side of the body, an upright cylindrical main slide moving vertically in each of said main guides and also rotatable horizontally therein, packing means arranged on the upper and lower ends of each tubular guide and around the cylindrical slide therein, an axle arm projecting laterally from the lower end of each cylindrical slide and forming a pivotal support for a vehicle wheel, a horizontal bearing plate arranged at the upper end of each cylindrical slide, a semi-elliptic spring having its central part mounted on the body and its opposite ends pressing downwardly on the bearing plates of the respective main slides, two upright auxiliary guides arranged side by side on the body between said main guides, retaining arms projecting toward each other from the upper ends of said main slides, auxiliary slides engaging said auxiliary guides, and adjusting means for connecting each retaining arm with one of said auxiliary slides and permitting transverse adjustment of the respective retaining arm relative to its auxiliary slide for aligning the wheels on the axle arms of the respective main slides.

DALE D. ARNER.